(12) United States Patent
Monir

(10) Patent No.: US 9,198,470 B1
(45) Date of Patent: Dec. 1, 2015

(54) SUSPENSION ADAPTER FOR RADIATION PROTECTIVE GARMENTS

(71) Applicant: George Monir, Maitland, FL (US)

(72) Inventor: George Monir, Maitland, FL (US)

(*) Notice: Subject to any disclaimer, the term of this patent is extended or adjusted under 35 U.S.C. 154(b) by 0 days.

(21) Appl. No.: 14/329,520

(22) Filed: Jul. 11, 2014

(51) Int. Cl.
| | | |
|---|---|---|
| *A47H 1/10* | (2006.01) |
| *A41D 13/00* | (2006.01) |
| *F16M 13/02* | (2006.01) |
| *G21F 3/025* | (2006.01) |
| *G21F 3/03* | (2006.01) |
| *G21F 3/00* | (2006.01) |
| *G21F 5/00* | (2006.01) |

(52) U.S. Cl.
CPC ......... *A41D 13/0002* (2013.01); *F16M 13/027* (2013.01); *G21F 3/025* (2013.01); *G21F 3/00* (2013.01); *G21F 3/03* (2013.01); *G21F 5/00* (2013.01)

(58) Field of Classification Search
CPC ....... A41D 13/0002; G21F 3/025; G21F 3/03; G21F 3/00; G21F 5/00
USPC ............ 250/505.1, 516.1; 223/85, 88, 92, 93; 248/230.8, 74.3; 24/23 B, 464, 465, 24/256 B
See application file for complete search history.

(56) References Cited

U.S. PATENT DOCUMENTS

| | | | | |
|---|---|---|---|---|
| 1,601,612 | A | * | 9/1926 | Edwards .......................... 248/66 |
| 8,198,616 | B2 | | 6/2012 | Rees |
| 2002/0084393 | A1 | * | 7/2002 | Torres ......................... 248/230.8 |
| 2007/0290100 | A1 | * | 12/2007 | Caveney ....................... 248/74.3 |
| 2011/0192125 | A1 | * | 8/2011 | Smithies et al. ................. 55/486 |

* cited by examiner

*Primary Examiner* — Christopher Garft
(74) *Attorney, Agent, or Firm* — Jason T. Daniel, Esq.; Daniel Law Offices, P.A.

(57) ABSTRACT

An adapter device for radiation protective garments includes a user engagement unit that is interposed between a lower member and an upper member via a connector. The lower member includes a generally curved main body having two shafts extending upward. The user engagement unit includes an upper shoulder strap having a pair of shaft apertures. The upper member includes a generally curved main body having another pair of shaft apertures and a protrusion extending from the top surface of the upper member. The lower member, upper member and user engagement unit are functionally secured by a pair of shaft connectors.

14 Claims, 6 Drawing Sheets

# SUSPENSION ADAPTER FOR RADIATION PROTECTIVE GARMENTS

TECHNICAL FIELD

The present invention relates generally to radiation protective vests, and more particularly to an adapter for connecting a conventional radiation protective vest to an overhead suspension system in a medical environment.

BACKGROUND

The statements in this section merely provide background information related to the present disclosure and may not constitute prior art.

Medical professionals such as doctors and nurses routinely wear protective garments while performing medical procedures such as cardiac catheterizations, for example. These garments are typically constructed as vests or aprons, which include radiation-absorbing materials such as lead or other metals, for example.

Although useful for preventing unwanted radiation exposure, these garments are often uncomfortable, ill-fitting and heavy, thereby placing a significant stress on the users' back and shoulders. Moreover, unlike patients who wear these garments for short periods of time, medical professionals must often wear these garments for several hours each day, thereby increasing the toll on their bodies over time.

For these reasons, it is not uncommon for medical professionals to purchase their own protective garments that are custom fit to suit the contours of the persons' body. Although this approach greatly improves the uncomfortable and ill-fitting problems associated with the traditional protective garments, it does not alleviate the back and shoulder problems discussed above.

Conversely, there are several known suspended radiation suit systems which utilize a cable and pulley to support the weight of an integrated body suit. In this regard, a medical professional wearing the suit will have limited movement about the operating room. However, the user must disconnect the suit (if possible) if he or she needs to move beyond the limitation of the suspension system in an emergency requiring free mobility, especially when radiation use is needed requiring the operator to maintain wearing his or her radiation protective garment.

Accordingly, the need exists for a device which can mate a traditional or custom made protective garment with a conventional suspension system in order to alleviate the drawbacks of the above noted devices, allowing the operator to use his/her own custom fitted suit.

SUMMARY OF THE INVENTION

The present invention is directed to an adapter device for radiation protective garments. One embodiment of the present invention can include a user engagement unit that is interposed between a lower member and an upper member via a connector. The lower member can include a generally curved member having two shafts extending upward. The user engagement unit can include an upper shoulder strap having a pair of apertures which can receive the two shafts. The upper member can also include a generally curved member having a pair of apertures which can receive the two shafts. The connector can move along the shafts and impart a tightening force onto each of the upper member and the shoulder strap to secure the elements together, and a protrusion extending from the top surface of the upper member can engage an overhead suspension system.

In yet another embodiment, a pair of adapter devices can engage a protective garment along the shoulder portion, and each of the protrusions can engage the overhead suspension system, in order to allow the system to reduce the weight of the garment while being worn by a user.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
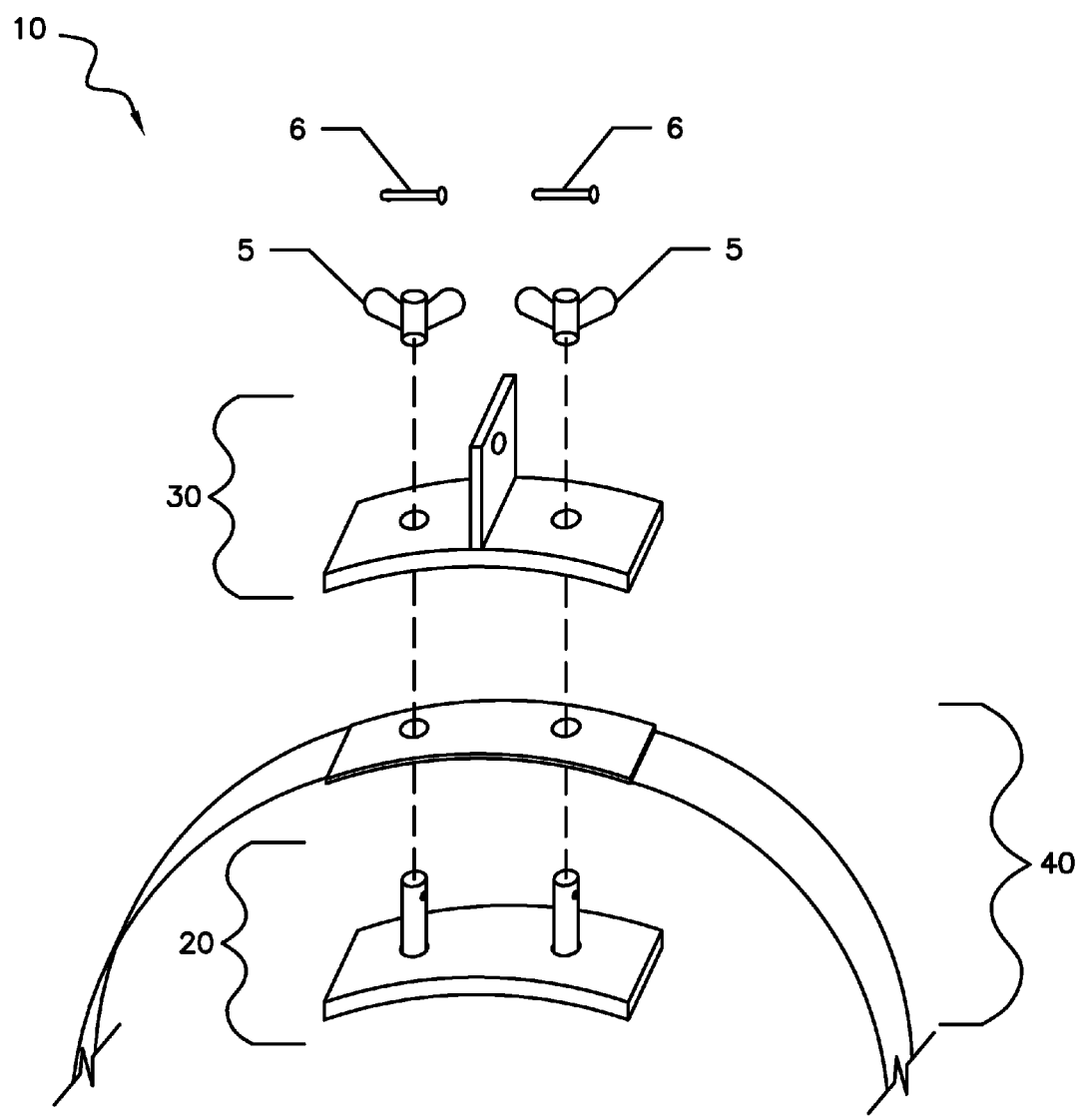
FIG. 1 is an exploded parts view of one embodiment of the suspension adapter for radiation protective garments that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As described herein, the term "removably secured," and derivatives thereof shall be used to describe a situation wherein two or more objects are joined together in a non-permanent manner so as to allow the same objects to be repeatedly joined and separated. As will be described throughout this disclosure, the present invention shall function as an adapter for mating a conventional non-modified radiation protective garment with a new or existing medical suspension system. One example of a suitable suspension system for use with this invention is described in U.S. Pat. No. 8,198,616, to Rees, the contents of which are incorporated herein by reference.

FIGS. 1-4 illustrate one embodiment of a suspension adapter for radiation protective garments 10 that is useful for understanding the inventive concepts disclosed herein. In this regard, FIG. 1 illustrates an exploded parts view of the device 10 that includes a lower member 20, an upper member 30, and a user engagement unit (i.e., shoulder strap) 40.

Figure 2:
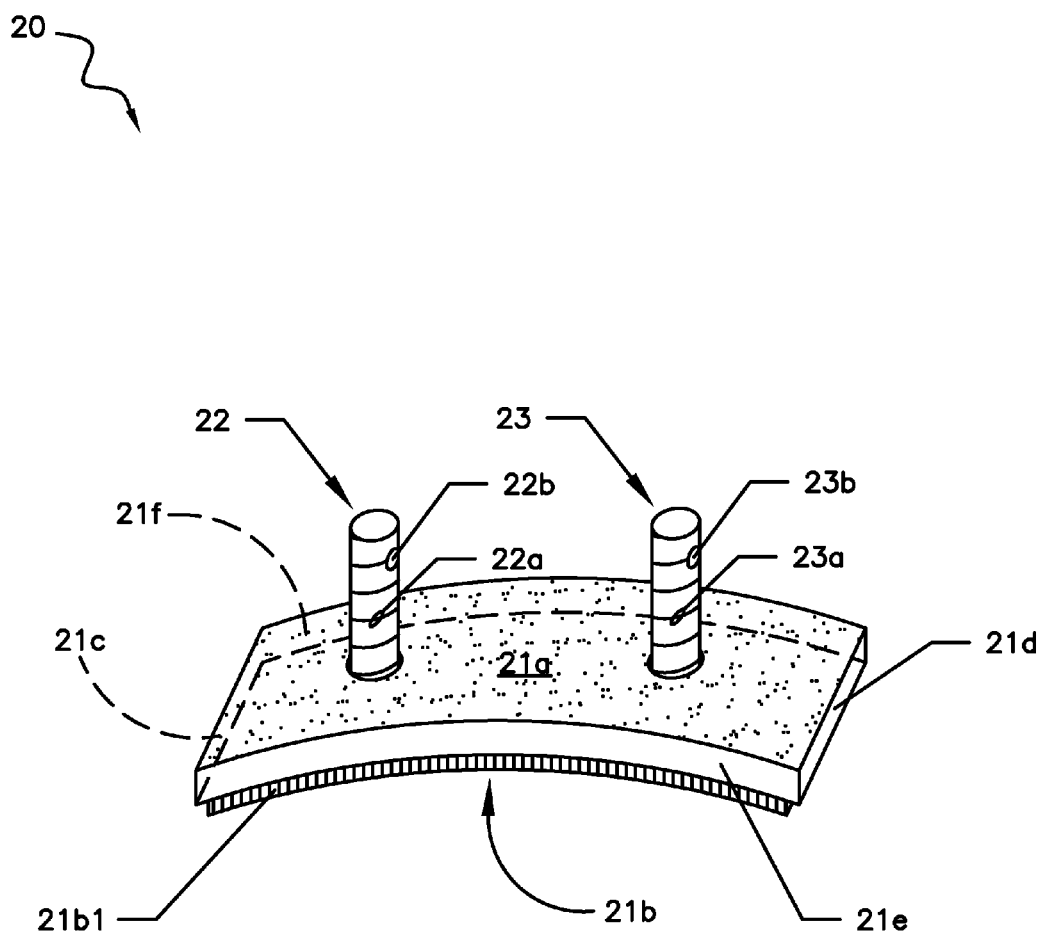
FIG. 2 is a side view of the lower member of the suspension adapter for radiation protective garments, in accordance with one embodiment of the invention.

As shown best in FIG. 2, the lower member 20 can include an elongated curved and generally rectangular main body 21 having a top surface 21a, a bottom surface 21b, a first end 21c, a second end 21d, and a pair of opposing side sections 21e and 21f. In one embodiment, the top surface of the main body 21a can include a rough texture or adhesive, so as to better engage the radiation protective garment or the shoulder strap, and the bottom surface can include a soft coating 21b1, such as foam or padding, for example, in order to provide comfort to a user.

A pair of elongated shafts 22 and 23 can extend orthogonally from the top surface of the main body. Each of the shafts having a generally parallel relationship to each other. As shown, each of the shafts can include a plurality of embedded elements forming screw threads 22a and 22b along the outer surface. As will be described below in detail, each of the shafts 22 and 23 can function to receive the shoulder strap 40 and the upper member 30, and the screw threads can function to engage a pair of shaft connectors such as wing nuts 5, for example, that can function to secure each of the elements together to prevent an inadvertent separation.

In another embodiment, each of the elongated shafts can further include an aperture 22b and 23b located along the upper edge. Each of these apertures can function to receive a locking pin 6 or other such hardware as a safety measure, in the unlikely event that the lock nut becomes loose on the shaft. Locking pins are extremely well known in the art, therefore a further description is not provided.

As will be well known to those of skill in the art, threaded elements typically include a plurality of lands and grooves which function to engage a secondary object having a plurality of complementary lands and grooves via a twisting motion. Although described above as utilizing threaded elements and lock nuts, this is for illustrative purposes only, as any number of other known connectors and components capable of securing each of the above noted items together in a removable manner can also be utilized. Accordingly, the apparatus is not limited to using threaded elements.

Figure 3:
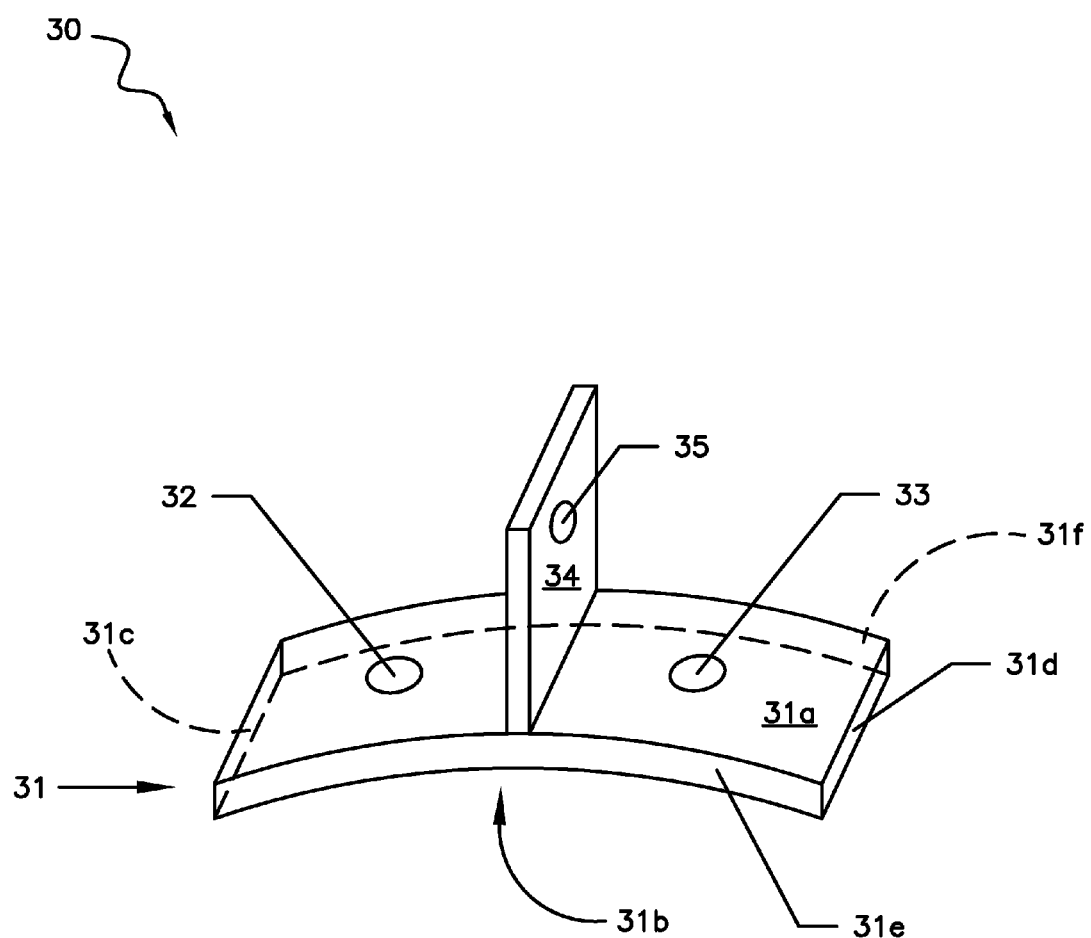
FIG. 3 is a side perspective view of the upper member of the suspension adapter for radiation protective garments, in accordance with one embodiment of the invention.

As shown best in FIG. 3, the upper member 30 can also include an elongated curved and generally rectangular main body 31 having a top surface 31a, a bottom surface 31b, a first end 31c, a second end 31d, and a pair of opposing side sections 31e and 31f. A pair of spaced shaft apertures 32 and 33 can be disposed along the main body 31, and can extend from the top surface 31a through the bottom surface 31b. Each of the shaft apertures including a shape, dimension and spacing along the main body that is complementary to, and suitable for receiving each of the shafts 22 and 23, respectively.

An elongated protrusion 34 can be centered between along the length of the main body 31 between sides 31c and 31d. The protrusion can extend orthogonally from the top surface and can include a width that extends from the side section 31e to the side section 31f. Of course, any number of other dimensions, shapes and locations along the main body 31 are also contemplated. Additionally, the protrusion can include an aperture 35 for receiving a hook from an overhead suspension system.

Although described above as including a protrusion 34 and an aperture for engaging a hook from an overhead suspension system, this invention is not to be construed as limiting to the same. In this regard, other embodiments are contemplated wherein the protrusion is replaced with a looped cord (not illustrated), or a cord having a removable connector along both ends, which can engage the overhead hook. As such, those of skill in the art will recognize that any number of different components capable of securing the overhead suspension hook onto the upper member in a removable manner can be utilized herein without undue experimentation.

In one preferred embodiment, each of the lower member 20 and the upper member 30 can include essentially identically shaped and sized main body sections 21 and 31, respectively, in order to allow the device to operate as described below. Such features being referred to as having complementary dimensions. Moreover, it is preferred that each of the members be constructed from a lightweight rigid and/or semi rigid material which may or may not absorb or reflect X-rays, such as injection molded plastic, for example; however, the invention is not limited to these construction materials, as any number of other materials that are suitable for use within a medical facility can also be utilized. In another embodiment, each of the members 20 and 30 can be constructed from, or include an outer coating of lead or other radiation shielding material, in order to allow the device itself to protect the user from the harmful effects of radiation.

Figure 4:
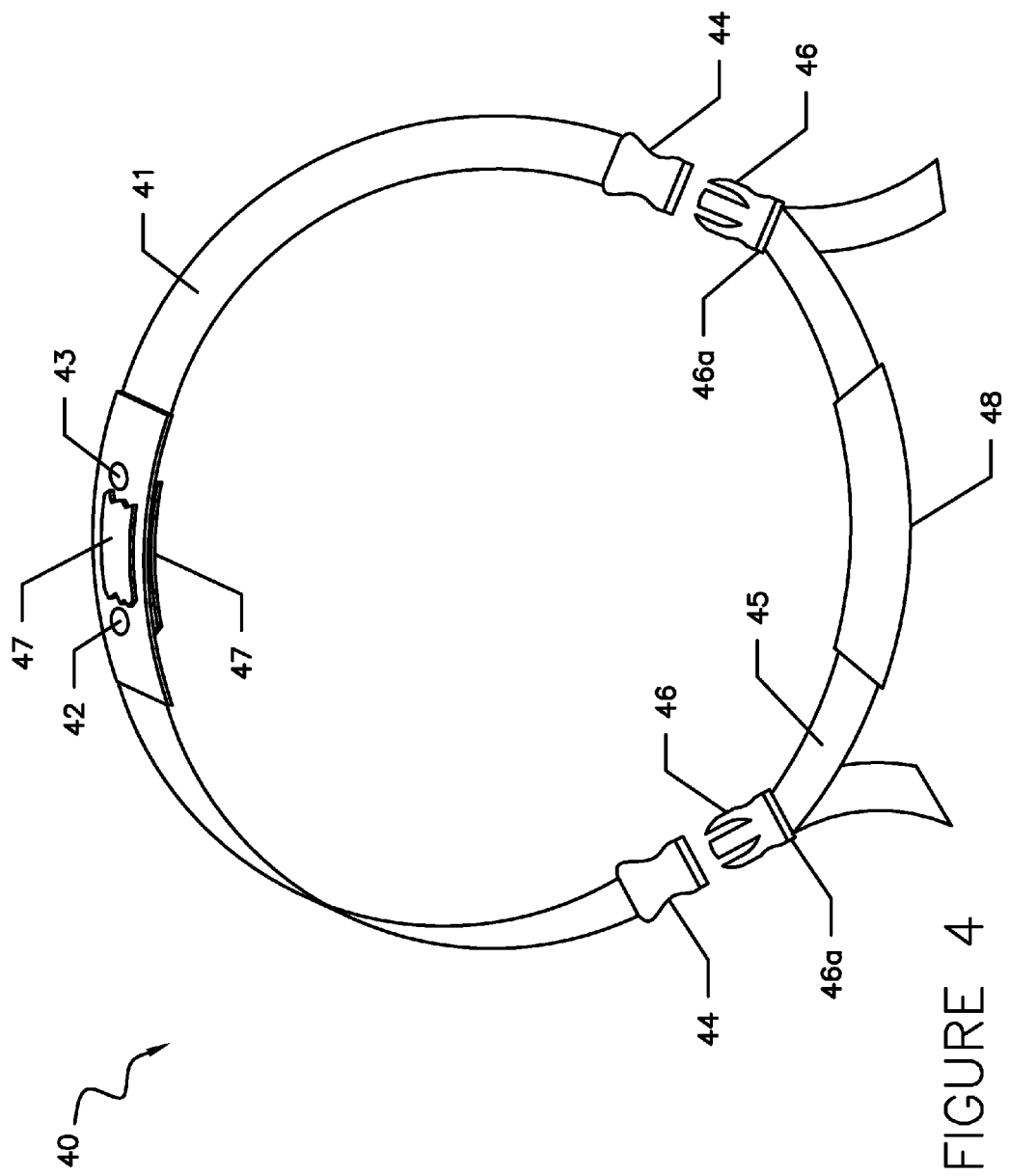
FIG. 4 is a perspective view of the user engagement unit of the suspension adapter for radiation protective garments, in accordance with one embodiment of the invention.

As shown best in FIG. 4, the user engagement unit 40 can include an elongated upper shoulder strap 41 that has a pair of spaced shaft apertures 42 and 43 disposed thereon. Each of the apertures can extend from the top surface through to the bottom surface of the strap, and can further include a shape, dimension and spacing (relative to one another) that is complementary to, and suitable for receiving each of the shafts 22 and 23, respectively, of the lower member 20. The upper strap 41 can also include a pair of readily releasable buckle receivers 44 that are secured along each end.

The user engagement unit 40 can also include an elongated lower shoulder strap 45 having a buckle tongue 46 at each end. As shown, each of the tongues can include a channel 46a for increasing or decreasing the length of the shoulder strap 45 relative to the tongues, in order to allow a user to loosen or tighten the strap while in use.

In operation, the tongues 46 of the lower shoulder strap 45 can slide into the buckle receivers 44 and snap closed. In this position, the straps 41 and 45 will be securely joined and will not unintentionally separate. Conversely, whenever it is desirable for the straps 41 and 45 to separate, a user can apply a pinching force onto the exposed sides of the tongues. In the preferred embodiment, each of the straps 41 and 45 can be constructed from nylon webbing and the buckles 44 and tongues 46 can comprise conventional quick release fasteners; however, any number of other suitable materials and components can be used.

In another embodiment, strips of adhesive material 47 such as double sided tape, for example, can be positioned along the upper surface and/or the lower surface of the upper strap 41. The adhesive material functioning to prevent the device from sliding laterally along the protective garment when the device is in operation. Of course, any number of other materials having a high coefficient of friction can be substituted for the tape. Additionally, the lower strap 45 can include a soft padded area 48. The padding can include any number of soft materials such as foam, rubber or cotton, for example, and can function to provide additional comfort to the user during device operation.

Figure 5:
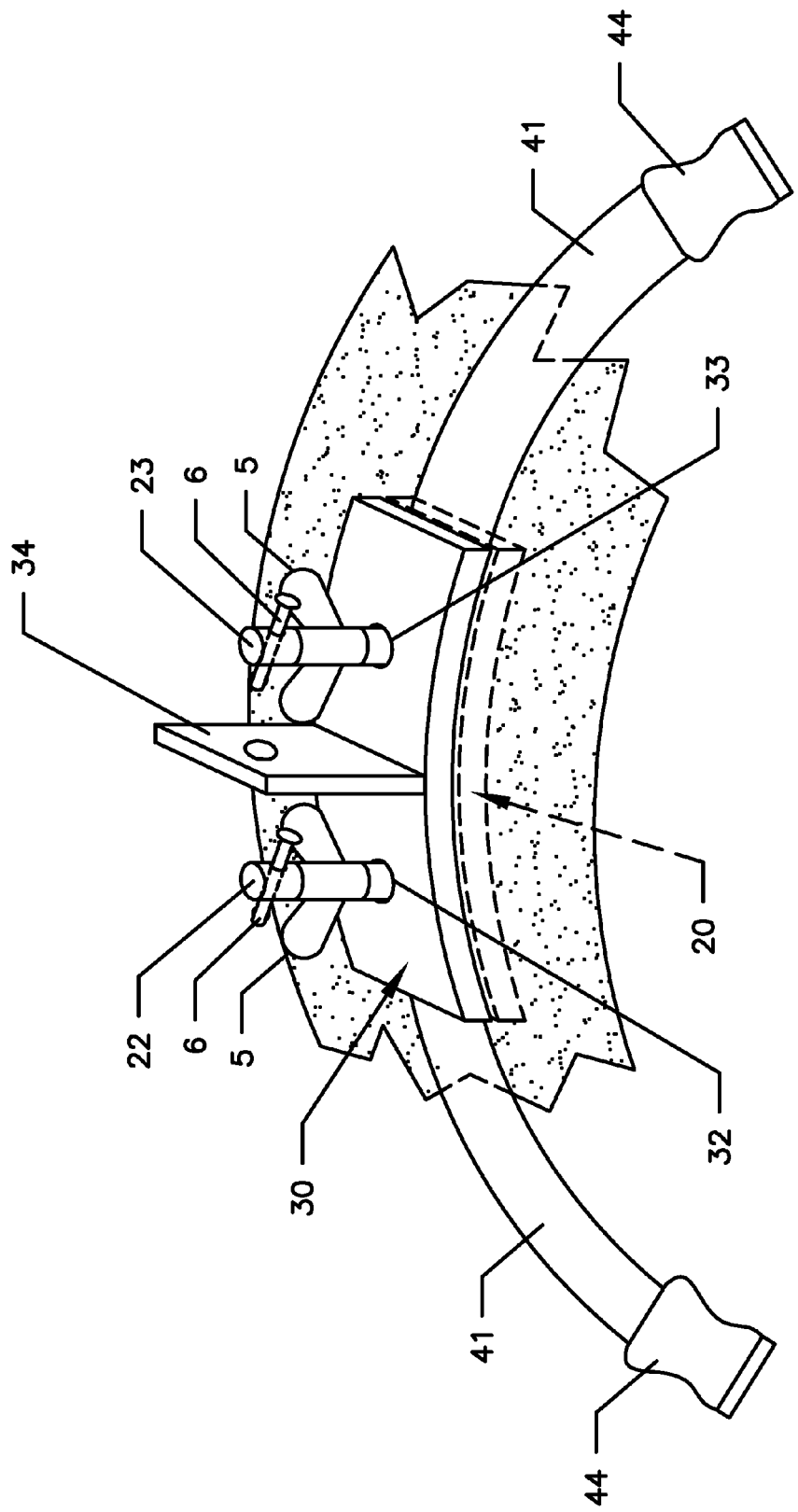
FIG. 5 is a side view of the suspension adapter for radiation protective garments in operation, in accordance with one embodiment of the invention.

FIG. 5 illustrates a perspective side view of one embodiment of the device 10 being secured onto one of the shoulder sections of a traditional protective radiation garment 5 (e.g., lead vest) which has been cut to include apertures for receiving the shafts 22 and 23 of the lower member 20. For the sake of clarity, only a portion of one of the shoulder sections of the garment 5 is illustrated; however, installation is identical for both shoulder sections.

As shown, the protective garment 5 can be placed onto the top surface of the lower member 20 so that the elongated shafts 22 and 23 extend upward through the apertures cut into the garment. Next, the upper shoulder strap 41 can be placed onto the top of the protective garment 5, so that the elongated shafts 22 and 23 extend upward through the shaft apertures 42 and 43, respectively. Next, the upper member 30 can be placed onto the top surface of the shoulder strap 41, so that the elongated shafts 22 and 23 extend upward through the shaft apertures 32 and 33, respectively. Finally, the wing nuts 5 and the locking pins 6 can engage the shafts 22 and 23 until each of the elements 20, 30, 40 and 5 are secured tight and cannot move relative to one another. At this time, the protrusion 34 extends upward from the garment 5 and is ready to engage an overhead suspension system.

Figure 6:
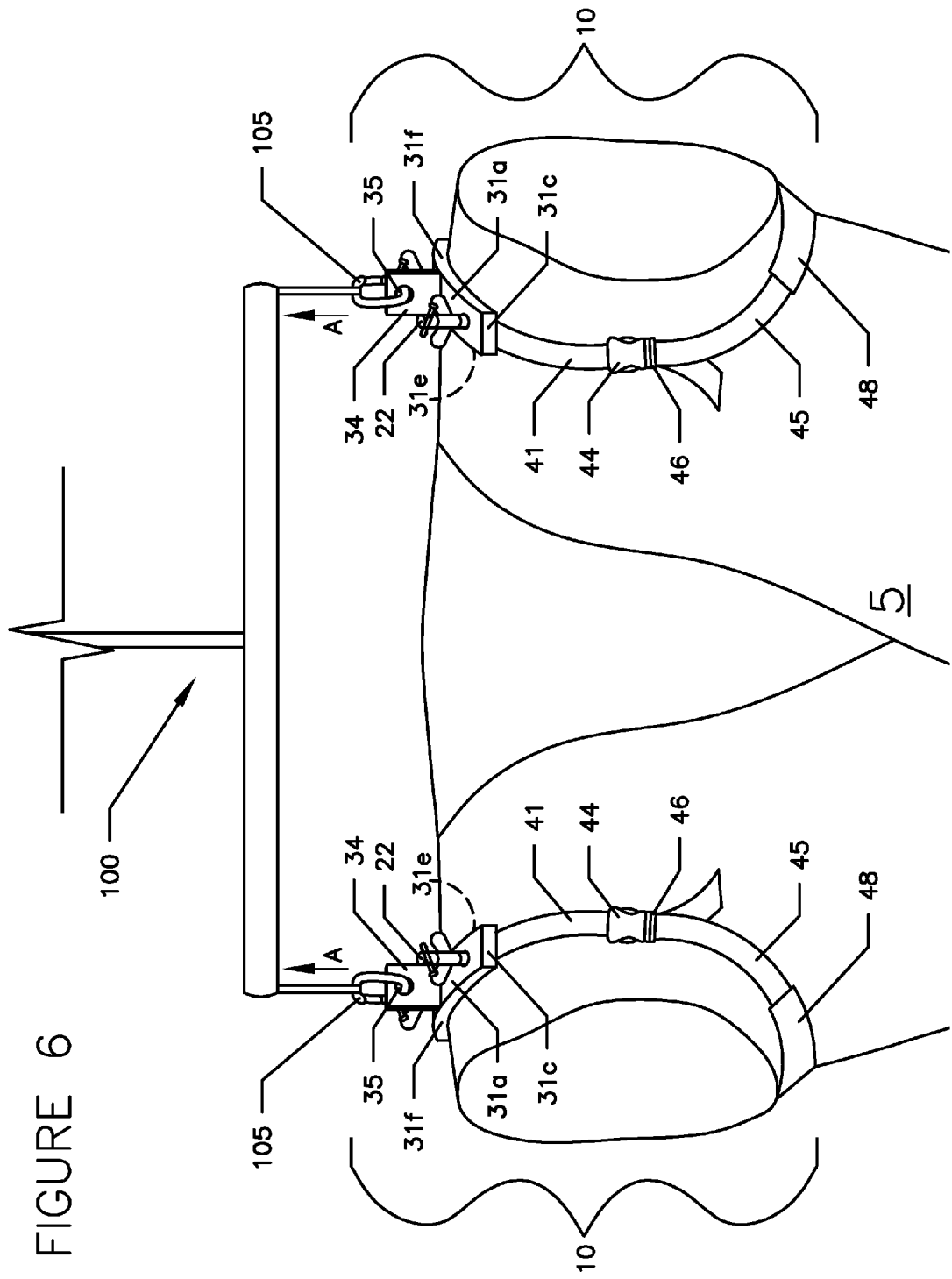
FIG. 6 is a front view of the suspension adapter for radiation protective garments in operation, in accordance with one embodiment of the invention.

FIG. 6 illustrates one embodiment of how the device 10 can function to secure a traditional protective radiation garment 5 (e.g., lead vest) to an existing overhead suspension system 100. As shown, once the device 10 has been secured onto each shoulder section of the garment 5, as described above, the hook 105 of the suspension system can be placed through the hook aperture 35 of the upper member.

In operation, the suspension system 100 can impart a lifting force A onto each device 10 via the hook 105. At this time, the centralized location of the protrusion 34 will function to ensure that both the proximal and distal ends of each device 10 are lifted evenly. Moreover, the lower shoulder strap 45 is designed to be positioned beneath the arm and/or armpit of the user wearing the garment 5. When so positioned, the upper and lower straps 41 and 45 can be engaged and adjusted to suit the comfort preferences of the user, and can further function to prevent a situation wherein the suspension system 100 inadvertently lifts the protective garment 5 off of the user and/or lifts the garment high enough to make contact with the neck or face of the user. Although the shoulder unit 40 is illustrated as being secured to the outside facing surface of the garment 5, this is for ease of illustration, as the straps 41 and 45 can also be worn underneath the garment, at the discretion of the user.

Accordingly, the above described suspension adapter for radiation protective garments 10 functions to allow traditional and/or user personalized protective garments to be utilized by any form of existing overhead suspension system, in order to reduce the fatigue associated with wearing the garments for long periods of time. Moreover, because the device allows the garments to be quickly and easily removed from the system, it becomes possible for users to move beyond the limits of the overhead system, and/or to remove the garment from the medical facility for use or cleaning elsewhere.

As described herein, one or more elements of the suspension adapter for radiation protective garments 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that any combination of one or more individual elements of the device such as the upper member, lower member, and/or shoulder unit, for example, may be formed together as continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An adapter device for radiation protective garments, said device comprising:
 a lower member having a main body that includes a top surface, a bottom surface, and a pair of elongated shafts extending orthogonally from the top surface;
 a pair of shaft connectors that are each configured to engage one of the elongated shafts;
 an upper member having a main body that includes a top surface, a bottom surface, and a pair of shaft apertures extending from the top surface to the bottom surface thereof,
  said upper member further including a protrusion extending orthogonally from the top surface of the main body, and having an aperture disposed thereon; and
 a user engagement unit that includes an upper shoulder strap and a lower shoulder strap that are configured to be removably secured together, said upper shoulder strap including another pair of shaft apertures disposed along a middle section thereof,
  wherein each of the pair of shaft apertures and the another pair of shaft apertures include a dimension that is suitable for receiving the elongated shafts,
  the elongated shafts include a generally parallel orientation with each other, each of the shafts include a plurality of embedded screw threads, and each of the shafts further include an aperture disposed along a distal end, said aperture being configured to receive a locking pin.

2. The device of claim 1, wherein the main body of each of the lower member and the upper member includes an elongated curved and generally rectangular shape.

3. The device of claim 2, wherein the main body of each of the lower member and the upper member include complementary dimensions to each other.

4. The device of claim 1, wherein the user attachment unit is configured to be interposed between the lower member and the upper member, and each of the pair of shaft apertures and the another pair of shaft apertures are configured to align with each other to form a pair of uniform pathways.

5. The device of claim 1, further comprising:

a padded section that is positioned along the bottom surface of the lower member.

6. The device of claim 1, wherein the protrusion is located along a central portion of the upper member, and the protrusion aperture includes a shape and dimension that is suitable for receiving a hook from an overhead suspension device.

7. The device of claim 1, wherein the upper shoulder strap and the lower shoulder strap are removably secured together via quick release fasteners.

8. The device of claim 7, wherein said quick release fasteners include a pair of buckle receivers and a pair of buckle tongues.

9. The device of claim 1, wherein the upper member and the lower member are constructed from a plastic material that does not reflect X-rays.

10. The device of claim 1, wherein the upper member and the lower member are coated with a radiation shielding material.

11. The device of claim 1, further comprising:

one or more strips of adhesive material that are disposed along the upper strap, said material being configured to engage a protective garment that is in contact with the upper strap.

12. The device of claim 1, further comprising a padded layer that is disposed along a portion of the lower shoulder strap.

13. An adapter device for radiation protective garments, said device comprising:

a lower member having a main body that includes a top surface, a bottom surface, and a pair of elongated shafts extending orthogonally from the top surface;

a pair of shaft connectors that are each configured to engage one of the elongated shafts;

an upper member having a main body that includes a top surface, a bottom surface, and a pair of shaft apertures extending from the top surface to the bottom surface thereof, said upper member further including a protrusion extending orthogonally from the top surface of the main body, and having an aperture disposed thereon; and a user engagement unit that includes an upper shoulder strap and a lower shoulder strap that are configured to be removably secured together, said upper shoulder strap including another pair of shaft apertures disposed along a middle section thereof, wherein each of the pair of shaft apertures and the another pair of shaft apertures include a dimension that is suitable for receiving the elongated shafts, wherein the upper shoulder strap and the lower shoulder strap are removably secured together via quick release fasteners, and said quick release fasteners include a pair of buckle receivers and a pair of buckle tongues.

14. An adapter device for radiation protective garments, said device comprising:

a lower member having a main body that includes a top surface, a bottom surface, and a pair of elongated shafts extending orthogonally from the top surface;

a pair of shaft connectors that are each configured to engage one of the elongated shafts;

an upper member having a main body that includes a top surface, a bottom surface, and a pair of shaft apertures extending from the top surface to the bottom surface thereof, said upper member further including a protrusion extending orthogonally from the top surface of the main body, and having an aperture disposed thereon; and a user engagement unit that includes an upper shoulder strap and a lower shoulder strap that are configured to be removably secured together, said upper shoulder strap including another pair of shaft apertures disposed along a middle section thereof, wherein each of the pair of shaft apertures and the another pair of shaft apertures include a dimension that is suitable for receiving the elongated shafts, and wherein the upper member and the lower member are coated with a radiation shielding material.

* * * * *